Jan. 26, 1960  A. C. LIND ET AL  2,922,173
PURIFICATION AND RECLAMATION OF LIQUID USED IN VEHICLE WASHING
Filed July 3, 1956  4 Sheets-Sheet 1

FIG. I.

INVENTORS,
ARTHUR C. LIND,
WILLIAM J. KATZ,
GARRETT O. M<sup>c</sup>INTOSH,
WILLIAM N. KONRAD George A. Evans
ATTORNEY INVENTORS,
ARTHUR C. LIND,
WILLIAM J. KATZ,
GARRETT O. McINTOSH,
WILLIAM N. KONRAD

*George N Evans*
ATTORNEY

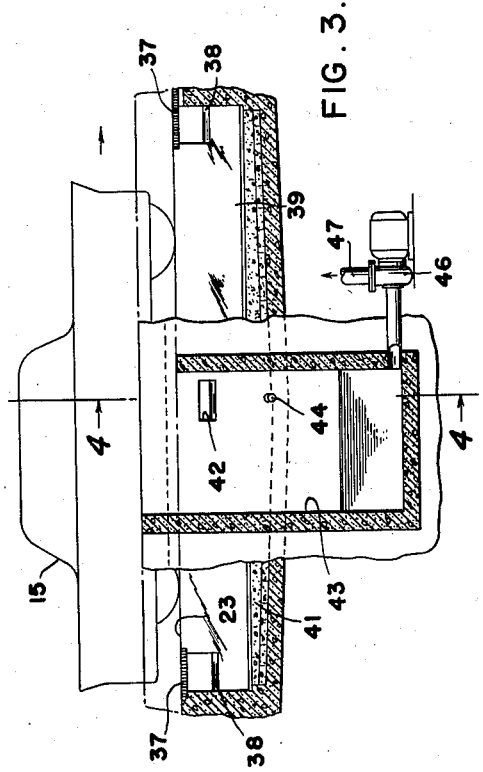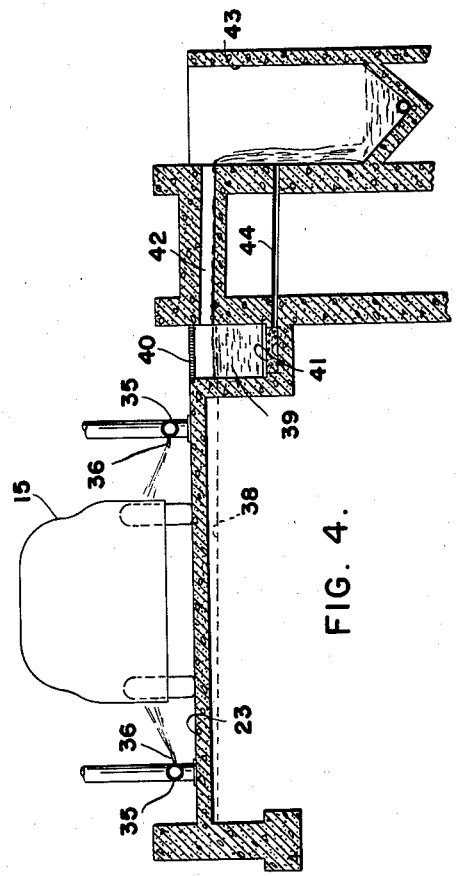

Jan. 26, 1960   A. C. LIND ET AL   2,922,173
PURIFICATION AND RECLAMATION OF LIQUID USED IN VEHICLE WASHING
Filed July 3, 1956   4 Sheets-Sheet 4
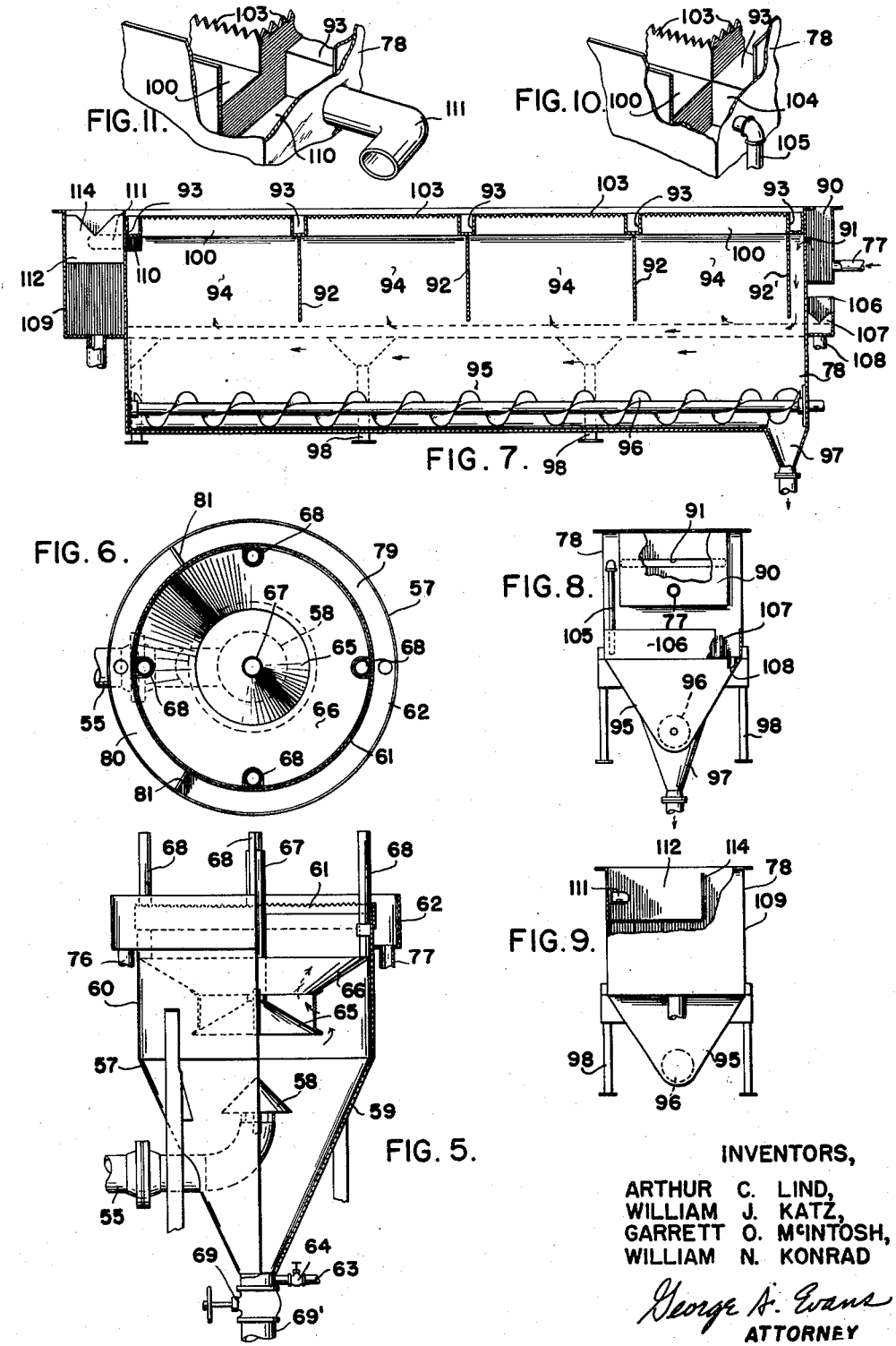
INVENTORS,
ARTHUR C. LIND,
WILLIAM J. KATZ,
GARRETT O. McINTOSH,
WILLIAM N. KONRAD
George A. Evans
ATTORNEY 2,922,173
PURIFICATION AND RECLAMATION OF LIQUID USED IN VEHICLE WASHING Arthur C. Lind and William J. Katz, Milwaukee, Garrett O. McIntosh, Fox Point, and William N. Konrad, Milwaukee, Wis., assignors to Chain Belt Company, Milwaukee, Wis., a corporation of Wisconsin Application July 3, 1956, Serial No. 595,683

10 Claims. (Cl. 15—3)

This invention relates generally to vehicle washing and more particularly to the purification and reclamation of liquids used in an automatic vehicle washing apparatus. In its broader aspects the invention relates to the washing of any object which may be moved past a series of stations on a conveyor, but for convenience, the description will be written with specific reference to the washing of automobiles.

It has been suggested previously that automatic automobile washing could be accomplished by passing an automobile on a conveyor through a series of stations where, in succession, washing, rinsing and drying operations are performed. Of the various operations, the washing phase has caused the most difficulty because grit and road grime and residue adhere very stubbornly to automobiles, and it has been difficult to find a spraying mixture that would remove these adhered films and particles without deleterious effect on the painted surfaces.

To answer this problem, it has been proposed that moistened balls of cotton or felt be sprayed at high speed upon the vehicle surfaces and it has also been suggested that finely ground rubber balls mixed with water be used. None of these systems have achieved success and at least one of the reasons for their failure was the inadequacy of the method and apparatus used for removing from the carrying liquid particles of dirt and road film picked up from the automobiles. Accordingly, it is a principal object of this invention to provide a novel system for cleaning such liquids after they have fallen from the vehicles bearing grit and other contaminants.

A further shortcoming of prior automatic car wash apparatus has been that a large portion of the material added to water to effect washing has been lost by inefficient reclamation systems, which obviously renders the car washing operation uneconomical. Accordingly, it is another object of this invention to reclaim substantially all of the water additive as it is removed from the vehicles in subsequent rinsing stations and to reconcentrate and return these additives to the principal supply of washing liquid.

A further shortcoming of the prior devices has been their large consumption of water, which is not only expensive but, in view of water shortages existing in many parts of the country, has made impractical the use of these systems. Accordingly, a still further object of this invention is to provide a water recovery system therefor which reduces to minor proportions the total consumption of water in the overall washing system.

The present invention is particularly useful and will be described in connection with the washing of vehicles with a slurry of finely ground hydro-cellulosic material such as saw dust and water. When applied in the proper concentrations and in the proper manner on vehicles, this mixture is remarkably effective in removing dirt and other material adhering to the vehicle and yet is not abrasive and does not remove wax or other protective coating applied to the paint.

The invention resides in initially eliminating grit and other abrasive material from the slurry which has been applied to the vehicles; concentrating the slurry recovered from subsequent rinsing stations and combining and reusing the concentrated and grit-free slurry in the washing of subsequent vehicles; the excess water resulting from the concentration of the slurry is employed in further rinsing operations so that consumption of water is greatly minimized. There is likewise a minimum loss of saw dust or other material constituting the slurry mixture.

The means of accomplishment of these and other objects will be clear from the following description and from the drawings in which:

Fig. 3 is a side elevation of a portion of the presoaking station used for removing easily removable grit, snow and mud adhering to the vehicles, and shows in side elevation the channels used for collecting water and grit falling from the vehicles and the pump used in recirculating water after the grit has been removed therefrom;

Fig. 4 is a section on a line 4—4 in Fig. 3 and shows the grit removal bed wherein grit removed from the vehicle in the pre-soak station settles, and the overflow arrangement for clean water adjacent the top of the bed together with the storage sumps from which fresh purified water is drawn for recirculation to the spray headers;

Fig. 5 is a side elevation partly in section of a grit chamber used for removing grit particles from the slurry solution used in the principal car washing station, and shows the means for removing grit from the lower portion of the chamber as well as means for introducing air to agitate the slurry and grit mixture in the lower portion of the chamber to permit grit particles to settle therethrough;

Fig. 6 is a top plan view of the grit chamber shown in Fig. 5 and illustrates in detail the effluent launder together with means therein to divide into two portions the flow of purified slurry solution leaving the grit chamber;

Fig. 7 is a side elevation of a slurry concentration chamber shown in section to illustrate the details of the internal construction thereof;

Fig. 8 is an end view of the influent or righthand end of the slurry concentration chamber shown in Fig. 7;

Fig. 9 is an end view of the effluent or lefthand end of the slurry concentration chamber shown in Fig. 7;

Fig. 10 is a perspective view with parts broken away to show details of a portion of the effluent weir and discharge launder surrounding the upper portion of the slurry concentration tank illustrated in Fig. 7, and is a portion of the upper lefthand corner of Fig. 8; and, Fig. 11 is a perspective view with portions broken away to show details of another portion of the effluent weir and discharge launder surrounding the upper portion of the slurry concentration chamber illustrated in Fig. 7, and is a portion of the upper lefthand corner of Fig. 9.

Figure 1:
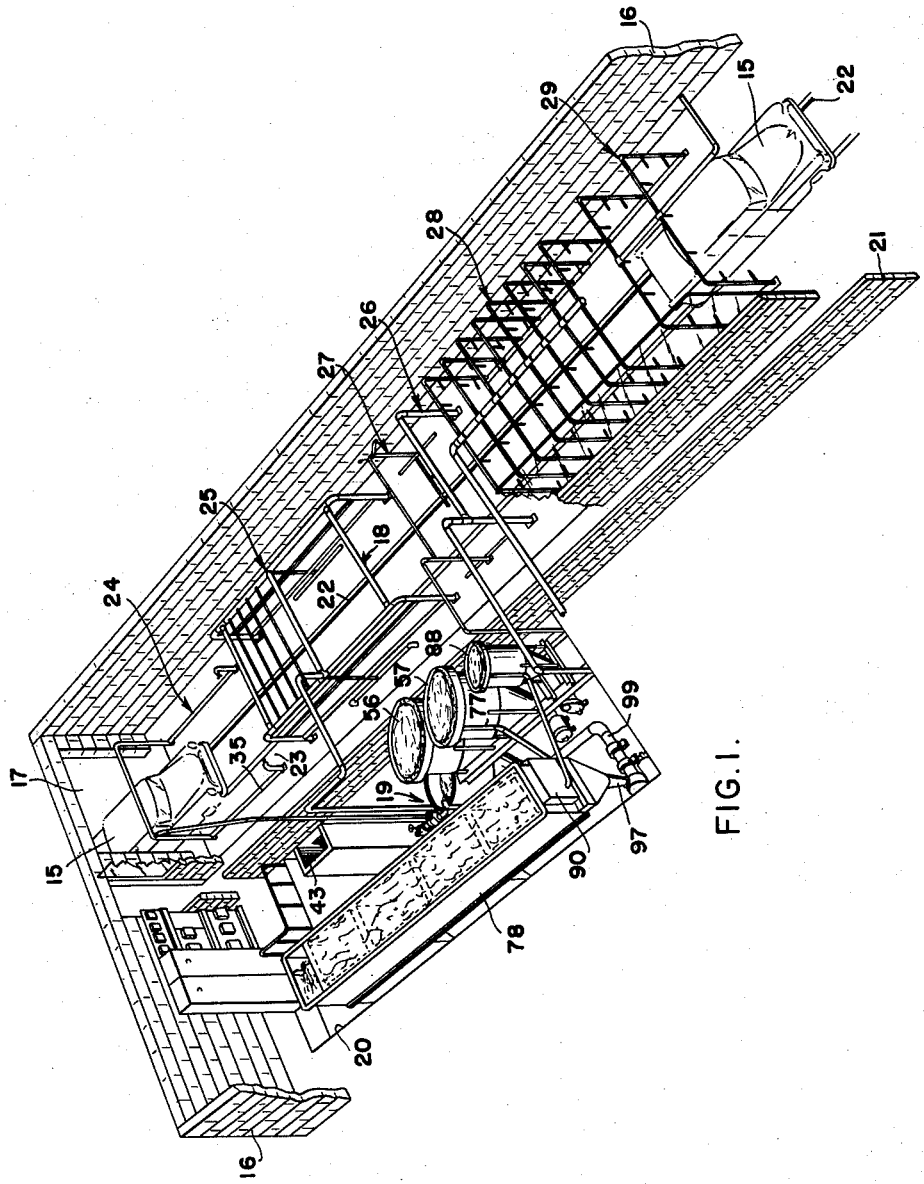
Figure 1 is a perspective general arrangement drawing showing the various vehicle washing and rinsing stations, the spray headers arranged therein and the solution purification and reclamation apparatus with its associated control panel.

Referring to the details of the drawings, vehicles 15 to be washed enter adjacent the upper lefthand portion of Figure 1 and travel through to emerge at the lower right portion of the drawing. The entire washing and solution recovery apparatus is preferably housed in a building 16 having an entrance 17 and an exit not shown. The washing and rinsing portion of the apparatus occupies the right side of Fig. 1, and comprises a tunnel-like path indicated generally by the numeral 18. The slurry purification and reclamation apparatus is located in the left-hand portion of Fig. 1, is indicated generally by numeral 19, and is preferably located in a pit 20 separated by a partial wall 21 from the washing apparatus.

Vehicles are pulled through the various washing and rinsing stations by a conveyor 22 arranged in the floor 23 of the building 16. The details of the conveyor form no part of this invention.

Washing of the vehicles takes place at a series of stations including a pre-soak station indicated generally by the numeral 24, a slurry wash station 25, a grill rinse station 26, a strip rinse station 27, a first rinse or slurry water rinse station 28 and a fresh water rinse station 29. After leaving the various washing and rinsing stations the vehicle passes through a drying station wherein heated air is played upon the vehicles at high velocity to effect the drying thereof. This station is not illustrated in the drawing and forms no part of the instant invention.

Figure 2:
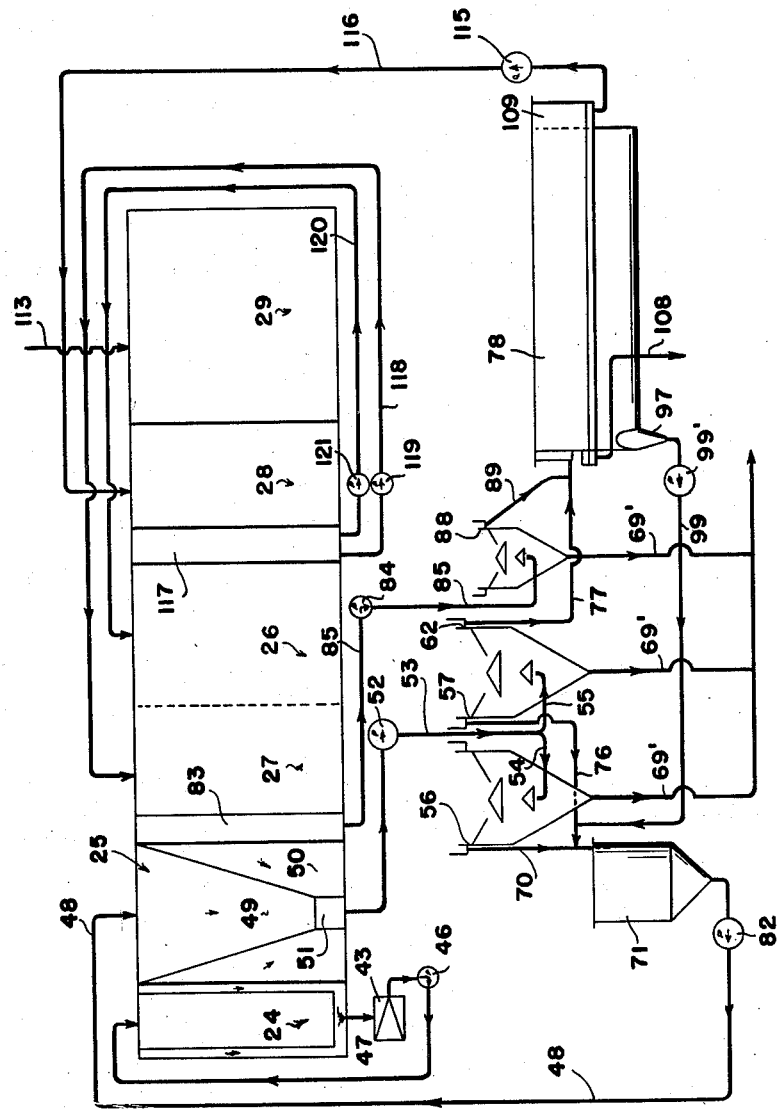
Fig. 2 is a flow diagram, partly schematic, and shows the washing and rinsing stations, more or less in plan view, together with their associated grit removal chambers, slurry concentration chamber, storage sumps, more or less in side elevation, and the flow of solutions through these various elements.

Referring to the flow diagram shown in Fig. 2, and particularly the pre-soaking station 24 which is illustrated in greater detail in Figs. 3 and 4, it may be seen that water is sprayed on the vehicles 15 by means of a header 35 and nozzles 36. Water with grit and other contaminants therein falls from the vehicles and passes through grills 37 in the floor 23 and into transverse channels 38 which are pitched to cause the contaminated solution to flow into a longitudinal channel 39 communicating with an end of the transverse channels 38. The longitudinal channel 39 is covered by a removable grill 40 and has a floor 41 of porous material such as brick or gravel. Adjacent the upper portion of one wall of the channel 39 is a draw-off conduit 42 communicating with a grit-free water sump 43. Beneath the porous floor 41 of channel 39 is a second draw-off conduit 44 also communicating with one wall of the channel and the fresh water sump 43. The longitudinal channel 39 functions as a grit separation means and grit bed, and contaminated solution flowing therein is detained for a sufficient length of time to permit gravity to cause the heavy contaminants in the solution to fall to the floor 41 while fresh water is left in the upper portion of channel 39 and is continuously decanted through conduit 42 to the fresh water sump 43. The porous floor 41 serves as a filter and water passing therethrough is likewise passed to the fresh water sump through conduit 44.

Periodically the cover or grill 40 may be removed, and with water circulation interrupted, grit collected in the lower portion of channel 39 may be removed manually. The porous floor 41 and conduit 44 provide the further advantage of dewatering grit in the channel so that water is not lost when the grit is removed.

In operation, the pre-soak station circulation system is a closed circuit with fresh water being pumped by the pump 46 continuously through the line 47 from sump 43 to header 35 and contaminated water being continuously cleaned by gravity separation in the channel or grit bed 39.

It is a feature of this invention that the pre-soak station is isolated from the balance of the circulating system and may be operated or not without effecting the operation of the balance of the system. Thus, in warm weather periods, when cars are less inclined to be very dirty, the pre-soak station may remain idle. Conversely, on cold months and particularly when cars have been operated in snow and slush, it will be found that they have adhering to them considerable quantities of snow, salt and sand used on streets, and at such times the pre-soak station will be found highly desirable.

Upon leaving the pre-soak station 24, the vehicle 15 is pulled by conveyor 22 to a slurry wash station 25. It has been found that sand and silt particles, as well as road grimes and grease, may be removed from vehicles by a slurry of finely ground particles such as saw dust and water. The particular materials used in this slurry and the concentration of solid materials in the slurry forms no part of this invention, which is concerned exclusively with the recovery of the slurry and the cleaning thereof so that it may be recirculated and sprayed upon subsequent vehicles without the injurious effect of spraying upon such subsequent vehicles material that has been removed from the surfaces of vehicles washed previously. By the novel purification and reclamation method and apparatus disclosed herein, substantially 99 percent of impurity is removed from the slurry solution, and it may be used and reused indefinitely without being replaced.

Referring particularly to Fig. 2, the slurry wash station 25 comprises headers and spray nozzles shown schematically, which are supplied by a conduit or line 48. Slurry falling from the vehicles passes through a floor grill into a depression 49 having sloping sides 50 directing the solution to a pit 51. From the pit 51 slurry is pumped by a pump 52 through a conduit 53 split at its lower end into branches 54 and 55. From the branch conduits 54 and 55 the contaminated slurry solution flows into a pair of substantially identical grit removal chambers 56 and 57.

The details of one of the grit removal chambers, 57, are best illustrated in Figs. 5 and 6. It may be seen that contaminated slurry liquid entering the lower portion of chamber 57 through branch conduit 55 is directed against the flat undersurface of the target 58 having a generally conical top to shed settling matter. The target functions to spread the flow of contaminated slurry liquid equally throughout the lower portion of the grit removal chamber 57.

As may be observed in Figs. 5 and 6, grit removal chamber 57 is constructed with a conical shaped hopper bottom 59 and a generally cylindrical shaped upper portion 60. Surrounding the upper periphery is an effluent weir 61 which may be notched as shown. Perimetrically disposed around the upper portion of the chamber is an effluent launder 62 arranged to intercept purified slurry liquid flowing over the weir 61.

In operation, contaminated slurry solution impinges upon the conical target 58 and disperses throughout the lower conical portion 59 of the chamber 57. If the solid constituent of the slurry being used is heavier than water, it will tend to compact in the conical bottom 59 and this compacted mass will interfere with the settling of grit therethrough. In order to effect a substantially complete separation of deleterious grit particles from slurry particles, it may be found advantageous to supply agitation to the particles in the lowermost portion of the conical bottom 59 by means of compressed air delivered through a pipe 63 and valve 64, the air being introduced directly into the liquid in the tank 57. The effect of air introduction is to mechanically agitate the slurry whereby heavier grit particles may fall through the slurry particles and collect at the bottom of the lower portion 59 of chamber 57. Depending upon the specific gravity of the material used to create the wash slurry, it may be found advantageous to supply air continuously, intermittently or perhaps for short periods before grit is withdrawn.

An escape for air, which forms bubbles within the slurry solution, is provided by conical baffles 65 and 66 communicating with air vents 67 and 68, respectively. The upper ends of each of the vents is above the top of the chamber 57. The vent 67 comprises a pipe arranged centrally of the chamber with the lower end communicating with the outwardly and downwardly flaring conical baffle 65. The lower edge of the baffle 65 is spaced substantially from the sides of the chamber. There are four vents 68 arranged 90° apart near the periphery of the chamber. They communicate with the baffle 66 which extends inwardly and downwardly from the sides of the tank. The lower edge of this baffle is spaced above the lower edge of baffle 65.

Slurry passing upwardly through the grit removal chamber 57 traverses a circuitous path between baffles 65 and 66 as indicated by the arrows in Fig. 5. Grit and other heavy particles settle to the lower portion of the conical bottom 59 from whence they may be removed periodically through the outlet pipe 69' by opening valve 69.

It is important in the design of the chambers 56 and 57, that the velocity of flow through the chambers permits the liquid to carry the slurry over the effluent weirs. By introducing the liquid into the narrower portion of the chamber, the velocity continues to diminish so that gravity separation is enhanced. Air introduction at the bottom of the cone causes the greatest agitative effect and frees the slurry from the compacted grit deposited therein. After the air bubbles are removed through the vents, the liquid above the baffles 65 and 66 is relatively quiescent and the velocity in the wider, cylindrical portion is lower. Here fine grit particles may be sorted out and can settle through the ascending flow.

The grit chambers have been found to be a very effective means of removing grit from slurry and form an important feature of this invention.

Purified slurry solution which passes over the weir 61 into effluent launder 62 is disposed of in different manners in chambers 56 and 57. As may be seen from Fig. 2, the entire flow from chamber 56 is discharged through a conduit 70 into a slurry storage sump 71. In the case of grit separation chamber 57, a portion of the flow of purified slurry is returned to the slurry storage sump 71 through a conduit 76, while the remainder of the purified slurry solution leaves the launder 62 through a conduit 77 and is discharged into a slurry concentration chamber 78. The means by which this division of flow is accomplished is apparent in Fig. 6 where it may be seen that the effluent launder 62 is divided into a large segment 79 and a small segment 80 by means of dams 81. Since the flow of purified slurry solution is substantially uniform over the entire periphery of weir 61, the portions of the flow distributed respectively to the sump 71 and the concentration chamber 78 will be directly proportional to the length of the circular segments 79 and 80. Grit removal chamber 56 is identical with chamber 57 except that the dams 81 are omitted from its effluent launder.

As is apparent in Fig. 2, purified slurry solution from the storage sump 71 is recirculated through a conduit 48 by a pump 82, thus completing the slurry wash circulation system.

Upon being conveyed from the slurry wash station 25, the vehicle 15 has been cleansed of grit, silt and road film, but retains some of the solid constituents of the slurry solution which has been sprayed thereon. At the next succeeding station or strip rinse station 27, sprays of clean water are applied to the entire vehicle to strip therefrom the balance of any remaining solid slurry constituent adhering thereto. At the following station or grill rinse station 26, specific sprays are arranged to rinse the portions of this solid slurry constituent from the radiator grill of the vehicle.

The liquids used in the grill and strip rinsing stations together with solid slurry constituents picked up thereby fall onto a pitched floor (not shown) beneath the floor 23 of the building and are passed thereover to a collection channel 83 from whence they are drawn by a pump 84 through a conduit 85 and enter a grit separation chamber 88 functionally and structurally identical with chamber 56, previously described. Purified slurry leaving grit separation chamber 88 has a considerably lighter density or solid constituent concentration than that circulating in the principal slurry circulating system because it is mixed with water used in the grill and strip rinses. This lightly concentrated slurry passes through a conduit 89 into the slurry concentration chamber 78.

While three grit removal chambers, 56, 57 and 88 have been shown, it will be apparent to those skilled in the art that certain of these chambers might in certain instances be combined. Multiple grit removal chambers have been illustrated for the purpose of disclosure because the system disclosed corresponds to several actual operating installations in which it has been found advantageous to use a plurality of grit separation chambers in order to limit the dimensions thereof, and thereby the height of the building necessary to house the car washing equipment. If the chambers are combined, dams 81 could be employed to divert a proper portion of the flow of purified slurry as previously described.

The details of construction of the slurry concentration chamber 78 are shown in Figs. 7 through 11. With particular reference to Fig. 7, the combined flows of purified slurry from grit separation chambers 57 and 88 enter an influent launder 90 and pass therefrom through a transverse slit-like opening 91 to the interior of chamber 78. It should be noted that chamber 78 contains a plurality of cells 94 formed by transverse baffles 92 extending from substantially mid-depth of the tank upwardly to the bottom portion of a plurality of transverse effluent launders 93 and transversely to the side walls of chamber 78. The advantages of the cellular construction of chamber 78 are described in detail in Patent No. 2,509,933 to Arthur C. Lind, but for the purpose of this disclosure, can be summarized by stating that more efficient concentration is obtained thereby permitting the use of a smaller tank than would be possible with a simple settling chamber without cells.

Slurry and rinse water entering through the opening 91 pass downwardly alongside the first or righthand baffle 92' and flow horizontally beneath the lower extremities of baffles 92 with a portion of the flow becoming vertical and flowing upwardly through each of the cells 94. The size of the tank 78 is made large enough to allow a detention of the solutions therein whereby the solid constituent of the slurry tends to settle to the lower portion 95 of the tank, while clear liquid is left standing in the upper portions of the cells. The effect of settling the slurry solids is to reconcentrate the slurry solution to that which is necessary for performing the slurry washing of vehicles, and slurry of this concentration is removed from the lower portion 95 of the tank by means of a helical conveyor 96 which moves the slurry to a discharge sump 97 at one end of the tank 78. From Figs. 8 and 9 it may be seen that the tank 78 is supported by legs 98 and that the lower portion 95 is tapered to facilitate the moving of concentrated slurry into the influence of the helical conveyor 96.

As is shown in Fig. 2, concentrated slurry removed from the sump 97 is pumped through a conduit 99 by the pump 99' and is returned to the slurry storage tank 71, where it is added to the slurry washing system.

Referring again to Figs. 7 through 11, the transverse launders 93 connect at their outer ends with longitudinal launders 100. Clear liquid is decanted from the upper portions of the cells 94 over notched weirs 103 and into launders 93 and 100.

While the liquid thus decanted is free of harmful abrasives, it may contain light oils and greases that have been removed from the vehicles. Because of the tendency of these light fractions to rise rapidly, the major portion of them will be found accumulating in the upper portion of the first or righthand cell 94 in Fig. 7. Since some fresh water must be added to the system for final rinsing of the vehicles, it is desirable that the water most apt to carry this grease be that which is wasted to balance the system and account for the addition of fresh water. Accordingly, it is preferable to dam off the effluent launders surrounding the righthand cell 94 in Fig. 7 and to waste the liquid flowing in these launders. Figure 10 illustrates a portion of the upper lefthand corner of Fig. 8 and further illustrates how this waste liquid is discharged. Referring to Fig. 10, liquid flowing toward the corner in launders 93 and 100 flows into a sump 104 from whence it is drawn off by a conduit 105. As best seen in Figs. 7 and 8, the conduit 105 communicates with a tank 106 having disposed therein a metering weir 107. By adjusting the elevation of weir 107, the amount of liquid passing thereover may be regulated to keep the system in balance. Having passed the weir 107, liquid is wasted through a conduit 108 which may be connected to a sewer, not shown.

At the lefthand end of Fig. 7 is a receiving tank 109 for clarified liquid removed from the balance of the cells 94. Referring to Fig. 11, the liquid flowing in the launders 93 and 100 fall into a sump 110 from whence it is passed through a bent-arm conduit 111 to a compartment 112 of the tank 109. Water passes from the compartment 112 over a weir 114 into the main body of tank 109, which acts as a storage tank for clarified water removed in the slurry concentration chamber 78.

Clarified water in the aforesaid tank 109 is pumped by a pump 115 through a conduit 116 to the reclaimed water rinse station 28.

As is apparent in Fig. 2, the vehicles receive a first rinse by the aforesaid reclaimed water and a second rinse with fresh water in station 29. In order to keep the system in balance, the quantity of fresh water added through line 113 as a final rinse is balanced with the quantity of water wasted from conduit 108.

The reclaimed water rinse and fresh water rinse are collected in a trough 117 in the floor 23 of the building 16. A portion of the water from this trough is pumped through a conduit 118 by a pump 119 to the grill rinse station 26. The balance of the water collected in trough 117 is pumped through a conduit 120 by means of a pump 121 to the strip rinse station 27.

The operation of the system heretofore described may be summarized in connection with the description of the actual operating conditions of an installation embodying the invention. The flow rates and other figures are given by way of example and it will be clear to those skilled in the art that the amounts may be varied to meet different conditions without departing from the spirit of the invention.

The quantity of water circulated through the pre-soaking station 24 will vary greatly depending upon the weather conditions and other factors and in certain localities and at certain times of the year may not even need be operated at all.

In a single line operating at the rate of 120 cars per hour, the quantity of water applied to the slurry wash station 25 was at a rate of 1,200 gallons per minute. The concentration of saw dust in the slurry applied to the cars was approximately 900 pounds of saw dust (dry) in 1,200 gallons of water. Approximately 50 gallons per minute of the effluent from the grit chambers 56 and 57 are directed to the concentrating chamber 78. This supply is combined with approximately 190 gallons per minute of dilute slurry leaving the second grit chamber 88, making a total flow of 240 gallons per minute through the concentrator. Approximately 50 gallons per minute of concentrated slurry are drawn from the bottom of the concentrator and combined with the 1.150 gallons per minute of slurry leaving the grit chambers as previously described. The combined flow constitutes the 1,200 gallons per minute of slurry to be applied in the first instance to the vehicles passing through the station 25.

Experience has demonstrated in such a system that it is desirable to waste about 30 gallons per minute of liquid from the first cell 94 of the concentrator. The remaining 160 gallons per minute of effluent from the concentrator is applied to the reclaimed water rinse station 28. The effluent from this rinsing station is combined with the effluent from the fresh water rinsing station, where approximately 30 gallons per minute of fresh water are applied as a final rinse. This combined effluent of 190 gallons per minute is then directed through the conduits 118 and 120 to the grill rinse and strip rinse stations 26 and 27 where their effluent is combined before introduction into the secondary grit chamber 88 as previously described.

The only loss of cellulosic material which occurs in the recovery system described is that which is not settled out in the concentrator or that which might still be adherring to the grit which is removed from the grit chamber. Both the grit chamber and the concentrator operate at a high degree of efficiency. In addition, a small amount of material may adhere to the cars, be lost on the floor, or otherwise disappear. The loss, however, is so small that only about one ton of saw dust is used for upwards of every 4,000 cars that are washed.

From the foregoing description it is apparent that the present invention provides an efficient, economical and novel system for reclaiming and clarifying solutions used in automatic vehicle washing installations. While for purposes of disclosure an entire working system has been described in detail, it is to be understood that certain of the steps may be dispensed with if the vehicles are lightly soiled and it is, therefore, intended that the scope of the invention be limited only by the appended claims.

We claim:

1. Apparatus for washing vehicles or the like comprising, a slurry recycle system having catchment means for receiving grit contaminated slurry falling from the vehicle being washed, grit separation means operatively associated with said catchment means for purifying said slurry by removing grit particles therefrom, means dividing the flow of purified slurry leaving the grit separation means, a storage tank operatively connected to receive a portion of the purified slurry, a concentration chamber operatively connected to receive the balance of such purified slurry, a rinse system for removing solid constituents of the slurry from the vehicle including catchment means for such solid constituents and rinse water falling from the vehicle, means conducting the aforesaid rinse water and solid constituents from the last mentioned catchment means to the aforesaid concentration chamber wherein gravity separation occurs with slurry settling to the lower portion of the chamber and clear rinse water remaining at the upper portion of the chamber, means returning slurry from the lower portion of the chamber to the slurry storage tank for reuse in the slurry recycle system, and means applying clear rinse water from the upper portion of the chamber to the vehicles for the rinsing thereof.

2. Apparatus for washing vehicles or the like comprising, a slurry recycle system having catchment means for receiving grit contaminated slurry falling from the vehicle being washed, grit separation means operatively associated with said catchment means for purifying slurry by removing grit particles therefrom, said grit separation means having an upper quiescent zone to encourage heavy grit particles to settle therefrom and a lower zone for the accumulation of grit particles, means dividing the flow of purified slurry leaving the upper portion of the grit separation means, a storage tank operatively connected to receive a portion of the purified slurry, a concentration chamber operatively connected to receive the balance of such purified slurry, a rinse system for removing solid constituents of the slurry from the vehicle including catchment means for such solid constituents and rinse water falling from the vehicle, means conducting the aforesaid rinse water and solid constituents from the last mentioned catchment means to the aforesaid concentration chamber wherein gravity separation occurs with slurry settling to the lower portion of the chamber and clear rinse water remaining at the upper portion of the chamber, means returning slurry from the lower portion of the chamber to the slurry storage tank for reuse in the slurry recycle system, and means applying clear rinse water from the upper portion of the chamber to the vehicles for the rinsing thereof.

3. Apparatus for washing vehicles or the like comprising, a slurry recycle system having cachment means for receiving grit contaminated slurry falling from the vehicle being washed, grit separation means operatively associated with said catchment means for purifying slurry by removing grit particles therefrom, said grit separation means having an upper quiescent zone for encouraging heavy grit particles to settle therefrom and a lower zone for the collection of grit particles, means providing mechanical agitation to the lower zone to further facilitate the settling of heavy grit particles through the slurry solution and the solid constituent thereof, means dividing the flow of purified slurry leaving the grit separation means, a storage tank operatively connected to receive a portion of the purified slurry, a concentration chamber operatively connected to receive the balance of such purified slurry, a rinse system for removing solid constituents of the slurry from the vehicle including catchment means for such solid constituents and rinse water falling from the vehicle, means conducting the aforesaid rinse water and solid constituents from the last mentioned catchment means to said concentration chamber wherein gravity separation occurs with slurry settling to the lower portion of the chamber and clear rinse water remaining at the upper portion of the chamber, means returning slurry from the lower portion of the chamber to the slurry storage tank for reuse in the slurry recycle system, and means applying clear rinse water from the upper portion of the chamber to the vehicles for the rinsing thereof.

4. In apparatus for washing vehicles or the like, a slurry recycle system having catchment means for receiving grit contaminated slurry falling from the vehicle being washed, grit separation means operatively associated with said catchment means for purifying slurry by removing grit particles therefrom, means dividing the flow of purified slurry leaving the grit separation means, a storage tank operatively connected to receive a portion of the purified slurry, a concentration chamber operatively connected to receive the balance of such purified slurry, a rinse system for removing solid constituents of the slurry from the vehicle including catchment means for such solid constituents and rinse water falling from the vehicle, means conducting the aforesaid rinse water and solid constituents from the last mentioned catchment means to said concentration chamber wherein gravity separation occurs with slurry settling to the lower portion of the chamber and slurry-free water remaining at the upper portion of the chamber, means returning slurry from the lower portion of the chamber to the slurry storage tank for reuse in the slurry recycle system, means applying slurry-free water from the upper portion of the chamber to the vehicles for the rinsing thereof, and means discharging a portion of the slurry-free water from the system as waste.

5. In apparatus for washing vehicles or the like, a slurry circulating system including a storage tank for slurry used in washing vehicles, means to convey slurry from said tank to a vehicle being washed, means to collect slurry draining from the washed vehicle together with grit and other matter washed therefrom, a grit separating apparatus connected to receive the slurry and grit from said collecting means and operative to separate the grit from the slurry, a conduit operatively connected to return the separated slurry to said slurry storage tank, means arranged to draw off the separated grit from said grit separating apparatus, a first rinsing means operative to rinse the vehicle to remove slurry residue therefrom, a rinse water circulating system including means to collect rinse water together with residue slurry draining from the rinsed vehicle, a slurry concentrating apparatus connected to receive the rinse water and residue slurry from said last mentioned collecting means, a conduit operatively connected to return the concentrated slurry and rinse water mixture to said slurry storage tank, means to convey slurry-free rinse water from said concentrating apparatus to said rinsing means, a final rinsing means including means supplying clean fresh water to effect final rinsing of the vehicle, means to collect the final rinse water draining from the rinsed vehicle, a conduit connected to convey water from said final rinse water collecting means to said first rinsing means to provide circulation of fresh water into said first rinsing system, and means to discharge excess slurry-free rinse water from said concentrating apparatus, the arrangement being such that the clean rinse water introduced in said final rinsing means replaces the used rinse water from said concentrating apparatus continuously while the concentrated slurry and rinse water mixture being returned to said slurry storage tank replaces used slurry from said slurry circulating system continuously for mixing with the rinse water in said concentrator, whereby the water in both said slurry circulating system and said rinse water circulating system is changed continuously while the slurry material is retained in said slurry circulating system.

6. In apparatus for washing vehicles or the like, a slurry circulating system including a storage tank for slurry used in washing vehicles, means to convey slurry from said tank to a vehicle being washed, means to collect slurry draining from the washed vehicle together with grit and other matter washed therefrom, a grit separating apparatus connected to receive the slurry and grit from said collecting means and operative to separate the grit from the slurry, a conduit operatively connected to return the separated slurry to said slurry storage tank, means arranged to discharge the separated grit from said grit separating apparatus, a first rinsing means operative to rinse the vehicle to remove slurry residue therefrom, a rinse water circulating system including means to collect rinse water together with residue slurry draining from the rinsed vehicle, a slurry concentrating apparatus connected to receive the rinse water and residue slurry from said last mentioned collecting means, a conduit operatively connected to return the concentrated slurry and rinse water mixture to said slurry storage tank, a conduit operatively connected to withdraw from said slurry circulating system excess slurry and dirty water mixture in an amount sufficient to maintain the quantity of slurry in said storage tank substantially constant and to discharge the excess slurry into said slurry concentrating apparatus to provide for mixing thereof with the rinse water therein, means to convey slurry-free rinse water from said concentrating apparatus to said rinsing means, a final rinsing means including means supplying clean fresh water to effect final rinsing of the vehicle, means to collect the final rinse water draining from the rinsed vehicle, a conduit connected to convey water from said final rinse water collecting means to said first rinsing means to provide circulation of fresh water into said first rinsing system, and means to discharge excess slurry-free rinse water from said concentrating apparatus, the arrangement being such that the clean rinse water introduced in said final rinsing means replaces the used rinse water from said concentrating apparatus continuously while the concentrated slurry and rinse water mixture being returned to said slurry storage tank replaces used slurry from said slurry circulating system continuously for mixing with the rinse water in said concentrator, whereby the water in both said slurry circulating system and said rinse water circulating system is changed continuously while the slurry material is retained in said slurry circulating system.

7. In apparatus for cleansing vehicles in which a slurry of hydro-cellulosic material is applied to the vehicles to remove foreign matter adhering thereto, a system for purifying the slurry whereby it may be reused without deleterious effect, comprising a separator for removing from the previously used slurry such foreign matter as abrasive grit and the like having a specific gravity higher than the hydro-cellulosic material, a storage tank for receiving slurry from the separator and holding it prior to its reapplication to the vehicles, a concentrator in which liquid and impurities having a specific gravity lighter than the hydro-cellulosic material are removed as an effluent therefrom, means for diverting a portion of the slurry leaving the separator to the concentrator, means returning the hydro-cellulosic material from the concentrator to the storage tank, and means for applying the effluent from the concentrator to the vehicles in a subsequent rinsing operation.

8. In apparatus for cleansing vehicles in which a slurry of hydro-cellulosic material is applied to the vehicles to remove foreign matter adhering thereto, a system for purifying the slurry whereby it may be reused without delterious effect, comprising a separator for removing from the previously used slurry such foreign matter as abrasive grit and the like having a specific gravity higher than the hydro-cellulosic material, a storage tank for receiving slurry from the separator and holding it prior to its reapplication to the vehicles, a concentrator in which liquid impurities having a specific gravity lighter than the hydro-cellulosic material are removed therefrom, and in which the said lighter impurities are separated from the rest of the concentrator effluent, means for washing said impurities, means for applying the rest of the concentrator effluent to the vehicles in a rinsing operation, means for diverting a portion of the slurry leaving the separator to the concentrator, and means returning the hydro-cellulosic material from the concentrator to the storage tank.

9. In apparatus for cleansing vehicles in which a slurry of hydro-cellulosic material is applied to the vehicles to remove foreign matter adhering thereto, a system for purifying the slurry whereby it may be reused without deleterious effect, comprising a separator for removing from the previously used slurry such foreign matter as abrasive grit and the like having a specific gravity higher than the hydro-cellulosic material, a storage tank for receiving slurry from the separator and holding it prior to its reapplication to the vehicles, a concentrator in which liquid and impurities having a specific gravity lighter than the hydro-cellulosic material are removed as an effluent therefrom, means for diverting a portion of the slurry leaving the separator to the concentrator, means returning the hydro-cellulosic material from the concentrator to the storage tank, means for applying the effluent from the concentrator to the vehicles to rinse off slurry adhering thereon, means conducting the slurry rinse liquid from the vehicles to the concentrator, means for applying fresh water to the vehicles as a final rinse, means for adding the fresh water rinse liquid to the concentrator effluent, and means for washing some of the concentrator effluent.

10. In apparatus for cleansing articles in which a slurry of small particles are applied to the articles to remove foreign matter adhering thereto, a system for purifying the slurry whereby it may be reused without deleterious effect, comprising a separator for removing from the previously used slurry such foreign matter as abrasives and the like having a spectific gravity higher than the cleansing particles, a storage tank for receiving slurry from the separator and holding it prior to its reapplication to the articles, a concentrator in which liquid and impurities having a specific gravity lighter than the cleansing particles are removed therefrom, means for diverting a portion of the slurry leaving the separator to the concentrator, and means returning the concentrated slurry from the concentrator to the storage tank.

References Cited in the file of this patent

UNITED STATES PATENTS

| 645,138 | Sleeper | Mar. 13, 1900 |
| 1,934,494 | Gillespie | Nov. 7, 1933 |